United States Patent
Narvaez et al.

(10) Patent No.: US 6,704,320 B1
(45) Date of Patent: Mar. 9, 2004

(54) DYNAMIC ALGORITHM FOR DETERMINING A SHORTEST PATH TREE BETWEEN NETWORK NODES

(75) Inventors: Paolo Narvaez, Chambridge, MA (US); Kai-Yeung Siu, Charlestown, MA (US); Hong-Yi Tzeng, Tinton Falls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/275,591

(22) Filed: Mar. 24, 1999

(51) Int. Cl.$^7$ .............................................. H04L 12/28
(52) U.S. Cl. ...................................... 370/408; 709/239
(58) Field of Search ................................ 370/408, 238, 370/230, 351, 352, 356, 255, 231, 256, 235, 252; 709/241, 244, 238, 239

(56) References Cited

U.S. PATENT DOCUMENTS

| | | | | |
|---|---|---|---|---|
| 5,115,495 A | * | 5/1992 | Tsuchiya et al. | 395/200 |
| 5,872,773 A | * | 2/1999 | Katzela et al. | 370/256 |
| 6,088,333 A | * | 7/2000 | Yang et al. | 370/238 |
| 6,098,107 A | * | 8/2000 | Narvaez-Guarnieri et al. | 709/239 |
| 6,122,283 A | * | 9/2000 | Lee | 370/408 |
| 6,347,078 B1 | * | 2/2002 | Narvaez-Guarnieri et al. | 370/230 |
| 6,370,119 B1 | * | 4/2002 | Bosso et al. | 370/252 |
| 6,400,681 B1 | * | 6/2002 | Bertin et al. | 370/218 |

* cited by examiner

Primary Examiner—Chi Pham
Assistant Examiner—Alexander O. Boakye

(57) ABSTRACT

A dynamic shortest path tree (SPT) algorithm for a router determines a new SPT for a root node in response to a link-state or other network topology change. The dynamic SPT algorithm determines the new SPT as an optimization problem in a linear programming framework based in an existing SPT in the router. The dynamic SPT algorithm emulates maximum decrement of a ball and string model by iteratively selecting nodes of the existing SPT for consideration and update of parent node, child nodes, and distance attributes based on the maximum decrement. For the maximum decrement, a node in the existing SPT is selected by each iteration based on the greatest potential decrease (or least increase) in its distance attribute. The ball and string model that may be employed for the dynamic SPT algorithm represents a network of nodes and links with a ball representing a node and a string representing a link or edge. The length of a string is defined by its link's weight. The set of strings connecting the balls defines a path between the root node and a particular node. The shortest path is the path defined by the strings from a root node to a particular node that are tight. For the dynamic SPT algorithm, an increase (or decrease) in an edge weight in an existing SPT corresponds to a lengthening (or shortening) of a string. By sequentially pulling balls away in a single direction from the ball of the root node, the new SPT becomes defined by the balls and tight strings.

13 Claims, 6 Drawing Sheets

FIG. 4
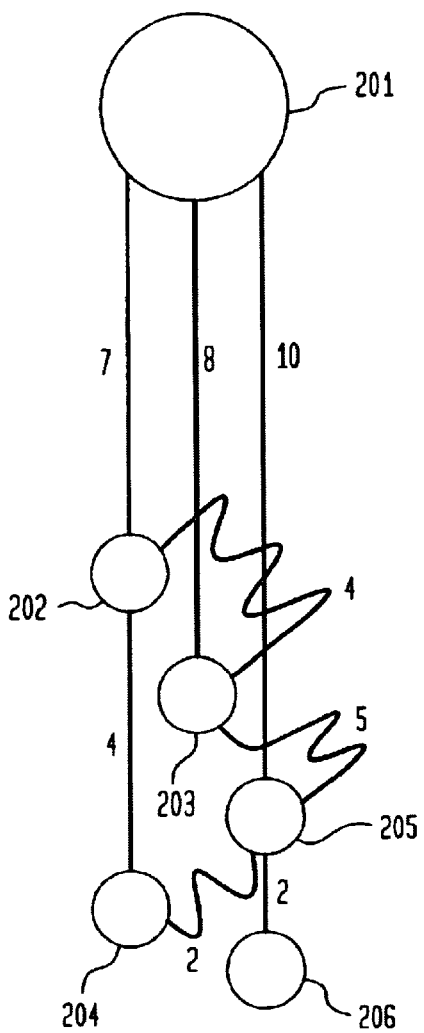
FIG. 5
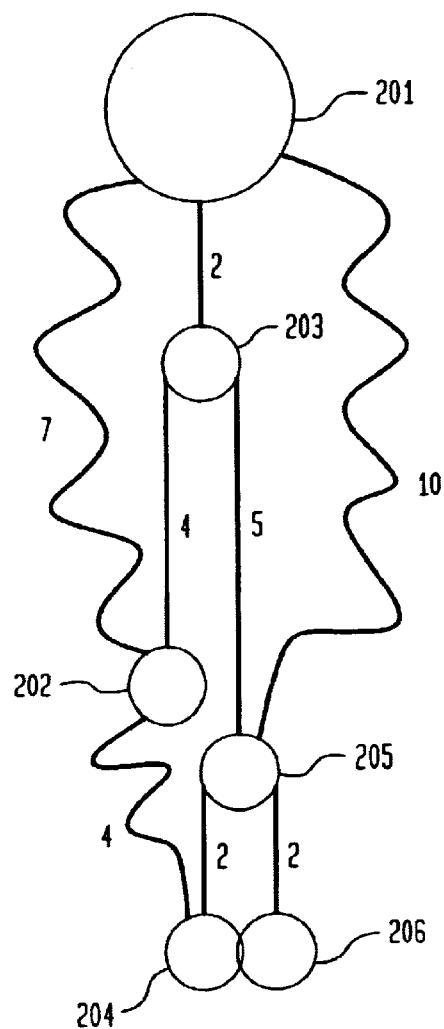
FIG. 6A
601  STEP 1: INITIALIZATION
602  IF NO SPT EXISTS, GO TO (A); OTHERWISE, GO TO (B)
603  (A) STATIC VERSION (APPLICABLE WHEN NO SPT EXISTS)
604  $\forall (n \in V) \neq root(G)$
605   $P(n, \bar{T}) \leftarrow \emptyset$
606   $D(n, \bar{T}) \leftarrow 0$
607   $V(n, \bar{T}) \leftarrow floating$
608   $C(n, \bar{T}) \leftarrow \emptyset$
609  ENQUEUE(Q, {root(G), (∅,0,0)})
610  GO TO STEP 2

FIG. 6B

```
611  (B) DYNAMIC VERSION (APPLICABLE WHEN AN OUTDATED SPT EXISTS)
612  CASE 1 (EDGE e_i ∈ E⁺ INCREASES ITS WEIGHT BY Γ_i):
613      Ñ ← ∅
614      ∀e_i ∈ E⁺      /* FOR EACH EDGE WHOSE WEIGHT HAS INCREASED */
615      W(e_i) ← W(e_i) + Γ_i  /* UPDATE ITS WEIGHT */
616        IF S(e_i)=P(E(e_i),T̂)  /* IF e_i IS IN T̂ */
617            C(S(e_i),T̂) ← C(N,T̂)-{E(e_i)}   /* DELETE e_i FROM T̂ */
618            N_d ← B_val(E(e_i),T̂)  /* CONSIDER ALL DESCENDENT NODES OF E(e_i)
619                                      REACHABLE VIA ANCHORED NODES IN EXISTING SPT */
620            ∀n ∈ N_d
621                V(n,T̂) ← floating    /* MAKE ALL SUCH DESCENDENT NODES FLOATING */
622            Ñ ← Ñ ∪ N_d
623      ∀e∈(Ñ) /* FOR EACH EDGE DIRECTED INTO A FLOATING NODE */
624        IF V(S(e),T̂) = anchored  /* IF ITS SOURCE NODE IS ANCHORED */
625            newdist = D(S(e),T̂)+W(e)   /* KEEP TRACK OF ITS END NODE'S POTENTIAL NEW
626            Δ = newdist-D(E(e),T̂)       DISTANCE AND IN THE INCREASE IN DISTANCE */
627            ENQUEUE (Q,(E(e),(S(e),newdist, Δ)))  /* UPDATE THE NODE WITH THE NEW
628                                                     DISTANCE AND NEW PARENT IN THE LIST Q*/
629  GO TO STEP 2
630  CASE 2 (EDGE e_i ∈ E⁻ DECREASES ITS WEIGHT BY Γ_i):
631      ∀e_i ∈ E⁻      /* FOR EACH EDGE WHOSE WEIGHT HAS DECREASED */
632      W(e_i) ← W(e_i)-Γ_i   /* UPDATE ITS WEIGHT */
633      newdist = D(S(e_i),T̂)+W(e_i)
634      IF newdist < D(E(e_i),T̂)   /* IF THE REDUCED WEIGHT OF e_i YIELDS A SMALLER
635                                     DISTANCE FOR E(e_i) */
636         Δ = newdist - D(E(e_i),T̂)   /* KEEP TRACK OF THE DIFFERENCE */
637         ENQUEUE (Q,(E(e_i),(S(e_i), newdist Δ)))  /* UPDATE THE NODE WITH THE NEW
638                                                       DISTANCE AND NEW PARENT IN THE LIST Q*/
639  GO TO STEP 2
```

FIG. 6C

640 STEP 2: NODE SELECTION
641 IF Q = ∅
642     TERMINATE
643 ELSE
644     $\{y,(x,d,\Delta)\}$ ← EXTRATMIN (Q)   /* SELECT AND REMOVE THE ELEMENT FROM
645                                               THE LIST WITH THE SMALLEST $\Delta$ */
646     $C(x,\vec{T})$ ← $C(x,\vec{T})+\{y\}$      /* UPDATE TREE STRUCTURE */
647     $C(P(y,\vec{T}),\vec{T})$ ← $C(P(y,\vec{T}),\vec{T})-\{y\}$
648     $P(y,\vec{T})$ ← x   /* UPDATE THE PARENT ATTRIBUTE OF THE SELECTED NODE */
649     $N_d$ ← $B_{max}(y,\vec{T})$   /* CONSIDER THE SELECTED NODE AND ALL ITS DESCENDENTS */
650 GO TO STEP 3

FIG. 6D

651 STEP 3: DISTANCE UPDATE
652 $\forall n \in N_d$
653     $D(n,\vec{T})$ ← $D(n,\vec{T})+\Delta$      /* UPDATE THE DISTANCE OF THE SELECTED NODE
654                                                    AND EACH DESCENDENT CONSIDERED */
655     $V(n,\vec{T})$ = anchored   /* EACH SUCH NODE NOW HAS THE CORRECT DISTANCE */
656     IF n∈Q AND $P(n,\vec{T})$ ≠ P(n,Q)
657         REMOVE (n,Q) /* ON NEED TO UPDATE ITS DISTANCE FURTHER */
658 GO TO STEP 4

FIG. 6E

659  STEP 4: NODE SEARCH
660  ∀e ∈ O(N_d)    /* CONSIDER ALL EDGES DIRECTED OUT OF THE SELECTED SUBSET OF NODES */
661      IF (D(E(e),T̂) > D(S(e),T̂)+W(e)) OR (V(E(e),T̂) = floating) /* IF THE REDUCED
662                                          DISTANCE OF A SELECTED NODE ALSO REDUCES OR DEFINES
663                                                              THE DISTANCE OF ANOTHER NODE */
664      newdist ← D(S(e),T̂)+W(e)
665      Δ ← newdist-D(E(e),T̂)
666  /* CHOOSE THE SMALLER DISTANCE AS THE NEW POTENTIAL DISTANCE */
667      ENQUEUE (Q,{E(e),(S(e),newdist, Δ)}) /* UPDATE THE NODE WITH THE NEW
668                                           DISTANCE AND NEW PARENT IN THE LIST Q*/
669  GO TO STEP 2

DYNAMIC ALGORITHM FOR DETERMINING A SHORTEST PATH TREE BETWEEN NETWORK NODES

BACKGROUND OF THE INVENTION

1. Field of the Invention

The present invention relates to routing of information packets in a communications network, and, more particularly, to a router determining shortest paths for communicating packets between nodes based on shortest-path trees.

2. Description of the Related Art

In an interconnected communications network employing packets, such as the Internet, routing protocols are employed by routers of the network to determine how packets are to be forwarded between nodes. Packets received by a node's router are forwarded to other nodes based on a forwarding table of an interior routing protocol. Interior routing protocols exchange network topology and link-state information ("network topology information") among routers to allow the node's router to construct the corresponding forwarding table. An example of a widely-used interior routing protocol is the Open Shortest Path First (OSPF) protocol, as outlined in J. Moy, "OSPF Version 2," Internet Draft, Request for Comment (RFC) 2178, July, 1997. In addition, some interior routing protocols associate a link cost, known in the art as a weight, with each link between nodes. The link cost may be associated with, for example, available bandwidth or revenue generated by the link. When link-state information (e.g., status, utilization, connectivity, or bandwidth) is exchanged between routers, each router in a regional network has a complete description of the network's topology.

Each router computes paths between nodes, and uses the weights to calculate a set of preferred paths. Each of the set of preferred paths that is computed has a minimum total weight for the path between the particular router and each other router in the region. This set of preferred paths may be defined with a shortest path tree (SPT). A forwarding table with routing information (e.g., source-destination pair, source ports, and destination ports) is generated from the SPT. The router uses the routing information to forward a received packet along the shortest path of the SPT to its destination. The SPT may be calculated using an algorithm such as Dijkstra's algorithm, described in E. Dijkstra, "A note: two problems in connection with graphs," Numerical Mathematics, vol. 1, 1959, pp. 269–271.

When the network topology of a regional network changes (e.g., a link fails, recovers, or changes its routing weights), each router in the region detects the change and updates the network topology information stored by the router. After updating its stored network topology information, each router recalculates a new SPT and forwarding table. In routers of the prior art, the recalculation deletes the current SPT and recalculates the new SPT from scratch (this type of recalculation method is known in the art as a statis algorithm).

However, for most changes in network topology, the new SPT does not differ significantly from the old SPT, and in many cases the old and new SPTs are the same. Statis algorithms that recompute the new SPT from scratch are inefficient because they do not take advantage of available information about the prior (outdated) SPT. Another drawback of statis algorithms is that multiple routes of the same shortest distance may coexist from one router to another router. When the SPT is re-computed from scratch, a different one of the coexisting multiple routes may be selected for the SPT than was selected by a prior computation. If a new path of the coexisting multiple routes is selected each time the new SPT is computed, the router may change many entries in its forwarding table frequently and unnecessarily, increasing the risk of routing errors or routing failures associated with implementing the change in routing.

To illustrate, FIG. 1 shows a regional network 100 of an Internet Service Provider (ISP) comprising four routers 101, 102, 103, and 104. The routers 101, 102, and 104 are commonly known as access routers and provide users a connection to the network 100. Router 103 connects the network 100 to a backbone packet network 105 that may be, for example, the Internet. Initially, link 106 (shown by a dashed arrow) between 103 and 104 is not in service (i.e., disconnected or not provisioned). The solid arrows indicate links which are preferred paths defined by an SPT calculated and stored in router 101 (commonly termed as an SPT "rooted at" router 101). The numeral next to each solid arrow in FIG. 1 is the weight assigned to the corresponding link. The forwarding table in router 101 contains forwarding entries, each forwarding entry corresponding to next-hop information of each user's network connection through router 103 to the backbone packet network 105. Initially, all packets routed from router 101 to backbone packet network 105 pass through router 102. However, if the link between routers 103 and 104 is established (i.e., either provisioned or recovered) and has a link weight of 1, the network topology changes and the SPT rooted at router 101 must be recomputed.

When the SPT is recomputed from scratch, the result may indicate that all paths to the backbone packet network 105 from router 101 now pass through router 104. Router 101 then changes the next-hop information for some or all network connections passing through router 103 to now pass through router 104. However, the path weight for the previous and new paths are the same and the changes may not be necessary. These changes may correspond to several thousand updates in the forwarding table of router 101, many of which may be redundant updates. In addition to redundant updates in forwarding tables, unnecessary changes in the SPT may also cause undesirable fluctuation of traffic load on any given route.

SUMMARY OF THE INVENTION

The present invention relates to routing packets in a packet network based on a shortest path tree (SPT) defining paths between nodes in the network. In accordance with the present invention, a temporary list of nodes in the network is generated for a current SPT, the list including nodes affected by a change in the weight of a link between two nodes in the network. The change in weight corresponds to the addition of a new link in the network or an increase or decrease in the weight of an existing link in the network. A selection process selects a node of the list in accordance with a maximum decrement criterion, the maximum decrement criterion identifying the node in the list having a most negative or a least positive associated distance change resulting from the change in the weight of the link. An update process updates one or more paths in current SPT for nodes reachable from the selected node, wherein the selected node is removed from the list and zero, one, or more of the reachable nodes are added to the list. The selection process and update process are repeated until the list is empty to generate an updated SPT. A router, for example, then routes one or more packets in accordance with the updated SPT.

BRIEF DESCRIPTION OF THE DRAWINGS

Other aspects, features, and advantages of the present invention will become more fully apparent from the following detailed description, the appended claims, and the accompanying drawings in which:

FIG. 4 illustrates a ball-and-string model for the network shown in FIG. 2 as may be employed with the present invention;

FIG. 5 illustrates a ball-and-string model for the network shown in FIG. 3 as may be employed with the present invention;

FIG. 6A shows an exemplary implementation of pseudo-code for a static version initialization step employed with the dynamic SPT algorithm of the present invention;

FIG. 6B shows an exemplary implementation of pseudo-code for a dynamic version initialization step of the dynamic SPT algorithm of the present invention;

FIG. 6C shows an exemplary implementation of pseudo-code for a node selection step of the dynamic SPT algorithm of the present invention;

FIG. 6D shows an exemplary implementation of pseudo-code for a distance update step of an exemplary implementation of the dynamic SPT algorithm of the present invention;

FIG. 6E shows pseudo-code for a node search step of the dynamic SPT algorithm of the present invention.

DETAILED DESCRIPTION

Figure 1:
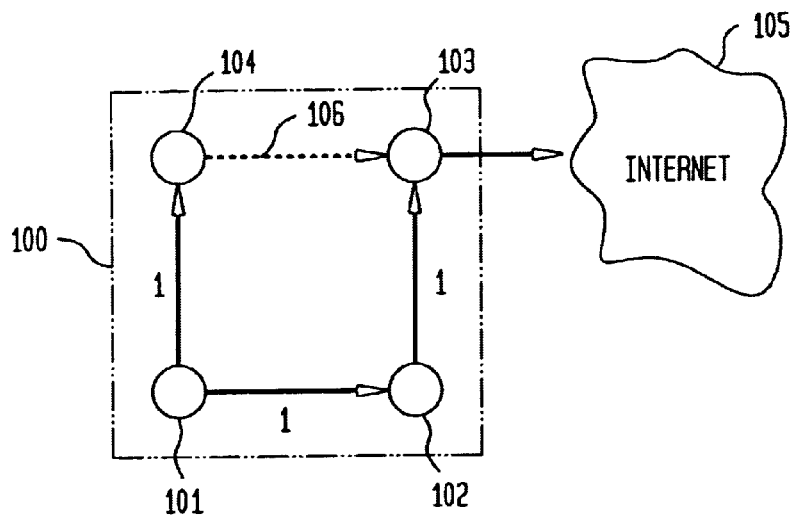
FIG. 1 shows a regional network connected to a backbone packet network and comprising four routers with one or more routers employing a prior art method of updating a shortest path tree.

In accordance with the present invention, a dynamic shortest path tree (SPT) algorithm for a router determines a new SPT for a root node in response to a link-state or other network topology change. The dynamic SPT algorithm determines the new SPT as an optimization problem in a linear programming framework based on an existing SPT in the router. The dynamic SPT algorithm emulates a ball and string model by iteratively selecting nodes of the existing SPT for consideration and update of the parent node, child nodes, and distance attributes based on the criterion of maximum decrement. In the ball and string model, a node in the existing SPT is selected in each iteration based on the greatest potential decrease (or least increase) in its distance attribute, which may be termed the criterion of maximum decrement.

The ball and string model that may be employed for the dynamic SPT algorithm represents a network of nodes and links with a ball representing a node and a string representing a link, or edge. The length of a string is defined by its link's weight. Each set of strings connecting the balls between the root and a particular node defines a path. The shortest path is the path defined by the strings from a root node to a particular node that are tight. For the dynamic SPT algorithm, an increase (or decrease) in an edge weight in the existing SPT corresponds to a lengthening (or shortening) of a string. By sequentially pulling balls away in a single direction from the ball of the root node, the new SPT becomes defined by the balls and tight strings.

Definitions and the Shortest Path Tree

A directed graph G of nodes and edges (links with weights) is defined as G=(V, $\epsilon$), where V denotes a set of nodes and $\epsilon$ denotes a set of edges in the graph G.

An integer value N denotes the total number of nodes in the set V, and an integer value ED denotes the total number of edges in the set $\epsilon$. The graph G consists of a root node denoted by $n_0$, and all other nodes are denoted as $n_1, \ldots, n_{N-1}$. Each of the nodes $n_1, \ldots, n_{N-1}$ may be reached from the root node $n_0$ by a directed path in G. The length of a path is the sum of the weights of the edges in that path. Each edge $e_i$ ($0 \leq i \leq ED-1$) has an associated positive weight (cost) of $w_i$.

A rooted tree T is a subgraph of G such that every node in G is reachable from the root $n_0$ through a unique directed path using only edges in the rooted tree T. The distance of a node $n_i$ (i=1, \ldots, N-1) in T is the length of the directed path in the rooted tree T connecting $n_0$ to $n_i$. The shortest distance of a node $n_i$ is the length of a shortest path in G connecting $n_0$ to $n_i$. A rooted tree T is said to be a shortest path tree (SPT) for the graph G if the distance to every node $n_i$ in rooted tree T is the shortest distance to $n_i$ in G. Multiple SPTs may exist within a given graph G, but each of the shortest distances to the nodes is unique.

Determining the Shortest Path Tree

With these definitions, the SPT for the root node $n_0$ may be determined. To determine an SPT, the solution of the SPT by calculation (the "SPT problem") may be formulated as an SPT optimization problem employing linear programming techniques. Liner programming techniques are known in the art and are described in, for example, David G. Luenberger, "Linear and Nonlinear Programming," Addison-Wesley (1984). Both primal and dual formulations of the SPT problem employing linear programming techniques may be employed and are known in the art. The following describes the dual formulation as may be employed with the ball-and-string model of the present invention.

For every directed edge $e_i$ connecting node $n_j$ to node $n_k$, a (row) vector $\bar{v}_i$ is created having a dimension of N (equal to the number of nodes). The N-dimensional row vector $\bar{v}_i$ contains all entries set to 0 except for the $j^{th}$ entry set to a '−1' and the $k^{th}$ entry set to a '+1'. Concatenation of all ED vectors $\bar{v}_i$ results in a connectivity matrix A having a dimension ED×N. An N-dimensional (column) vector $\bar{u}$ is defined such that the $i^{th}$ entry $u_i$ corresponds to a distance of node $n_i$ from the root node $n_0$, one possible entry $u_i$ is a potential shortest (or Euclidean) distance. If $u_i^*$ is defined as the shortest distance of node $n_i$ ($u_0^*=0$), then the difference between shortest distances of nodes $n_j$ and $n_i$ is $u_j^* - u_i^* \leq w_l$, where $w_l$ is the weight of the edge connecting $n_i$ to $n_j$. Thus, if $\bar{w}$ denotes the (column) vector of all edge weights $w_l$ and $\bar{u}^*$ represents the vector of shortest distances, then $\bar{u}^*$ satisfies the feasibility constraint as given in equation (1):

$$A\bar{u} \leq \bar{w}; u_0 = 0. \qquad (1)$$

There are infinitely many vectors $\bar{u}$ that satisfy the above matrix inequality and only one of them corresponds to the vector of shortest distances $\bar{u}^*$. The vector of shortest distances $\bar{u}^*$ may be determined by solving the following linear optimization problem defined by the maximization given in equation (2):

$$\max(\overline{b}^T \overline{u}) \quad (2)$$

where the solution of equation (2) is subject to the feasibility constraint given by equation (1), and where $\overline{b}$ is an N-dimensional vector with each entry equal to 1. The value of $(\overline{b}^T \overline{u})$ represents the sum of the potential distances of all nodes.

The feasibility constraint of equation (1) ensures that the difference between the distances $u_i$ and $u_j$ associated with nodes $n_i$ and $n_j$ is no greater than the weight of the edge connecting the nodes. This is true for the case of an SPT where the distance $u_i$ is the length of a shortest path from $n_0$ to $n_i$. The vector of shortest distances $\overline{u}^*$ may be determined by maximizing the sum of the potential distances $u_i$ of all nodes, while respecting the feasibility constraint of equation (1).

In order to determine an SPT from the solution of the vector of shortest distances $\overline{u}^*$ of the linear optimization problem of (2), the vector of shortest distances $\overline{u}^*$ may be substituted into the feasibility constraint of equation (1). If the row i provides the matrix equality for equation (1), the corresponding edge $e_i$ may be used for the SPT.

Ball-and-String Model

The linear programming formulation of the SPT problem may be illustrated with a ball-and-string model. A collection of balls represents the graph G, each of the balls corresponding to a node in V. Each edge $e_i$ has a corresponding weight $w_i > 0$ connecting adjacent nodes $n_j$ and $n_k$ in the graph G. Weight $w_i$ corresponds to an inelastic string of length $w_i$ that connects the balls representing nodes $n_j$ and $n_k$. The vector $u_i$ denotes the Euclidean distance between the balls representing $n_0$ and $n_i$. For the following, the terms "ball" and "node" are used interchangeably.

Since none of the strings may stretch beyond its defined length, the vector of Euclidean distances $\overline{u}$ always satisfies the feasibility constraint of equation (1). Moreover, a string becomes "tight" when the Euclidean distance between the two attached nodes equals its length. The optimal solution of equation (2) is determined by sequentially pulling the balls (in the same direction) so as to maximize their Euclidean distances from the ball representing the root node $n_0$. For the dynamic SPT algorithm, this operation of the ball and string model is the maximum decrement criterion for the distance change for a ball (node) when selecting nodes for consideration during the iterative steps. In other words, a maximum decrease or minimum increase in distance of a node from the root node is used to iteratively select each node (the "sequentially pulling" of the ball and string model) to solve the linear programming formulation of the SPT problem.

When the balls (nodes) are stretched out from $n_0$ as much as possible, their distances from the ball representing the root node form a vector $\overline{u}^*$ that corresponds to the optimal solution for the SPT. If there is only one SPT in the graph, the strings that are tight define the SPT. If there are multiple SPTs, each string that is tight will correspond to an edge that is part of some SPT.

Dynamic SPT Algorithm Employing Ball-and-String Model

The dynamic SPT algorithm of the present invention is described with the ball-and-string model. The dynamic SPT algorithm may include a calculation of an initial SPT according to the Dijkstra algorithm (i.e., the static SPT), which is briefly described using the ball-and-string model.

The iterative execution of the Dijkstra algorithm may be as follows. If a ball corresponding to the root node $n_0$ is anchored at a fixed position, while other balls are "floating" in the sense that their attached strings are not tight. Initially, all balls are at the same position. In a first iteration, the ball connected to $n_0$ and having the shortest string (shortest distance to the root node $n_0$) is pulled away from $n_0$ (always in the same direction) and is anchored in a similar manner to the anchoring of the ball corresponding to $n_0$.

For a second iteration, the floating ball that has a string connected to at least one of the anchored nodes and is closest (i.e., the smallest distance through that string) to the root node $n_0$ is selected, This node is then pulled away (along the same direction as before) until that string becomes tight and the ball is then anchored. The procedure of the second iteration is repeated until all floating balls are anchored. The Euclidean distance of an anchored ball from the root ball then represents its shortest distance. The anchored balls and the set of shortest distance paths form the static SPT.

Once the static SPT is determined, and when a change in network topology occurs, new routing may be calculated in accordance with the dynamic SPT algorithm. To determine a new SPT from an outdated SPT using the dynamic SPT algorithm, computational complexity and the changes to the topology (root tree) of the outdated SPT are desirably minimized when the method employs the node selection based on the maximum decrement in distance of the ball and string model. The ball-and-string model of the execution of the dynamic SPT algorithm as follows.

When the length of a string changes (corresponding to a change of an edge's weight), two cases are considered: a first case where the distance increases and a second case where distance decreases. When the length of a string increases, the ball corresponding to the root node $n_0$ is anchored at a fixed position and the remaining balls (nodes) are all moved in the same direction, such as if the balls are allowed to drop under gravity. The ball (node) attached to the lower end of the string (as well as others) moves away (or "falls" under the gravity illustration) from the anchored ball (node no) for some distance until at least one of the strings attached to the moving ball (node) becomes tight. This step sets all nodes to a "floating" condition and allows them to move together at once. As described before, the resulting Euclidean distance of a node $n_i$ from an anchored root node $n_0$ is equivalent to the shortest distance of $n_i$.

When the length of a string decreases, the ball attached to the lower end of the string (as well as others) moves toward (or "rise" under the gravity illustration) the anchored ball (node $n_0$) for some distance. Following the gradual changes in string lengths between nodes (i.e., the sequence of distance changes performed as the balls are allowed to "rise" with the ball-and-string model) corresponds to the optimal execution of the dynamic SPT algorithm.

Figure 2:
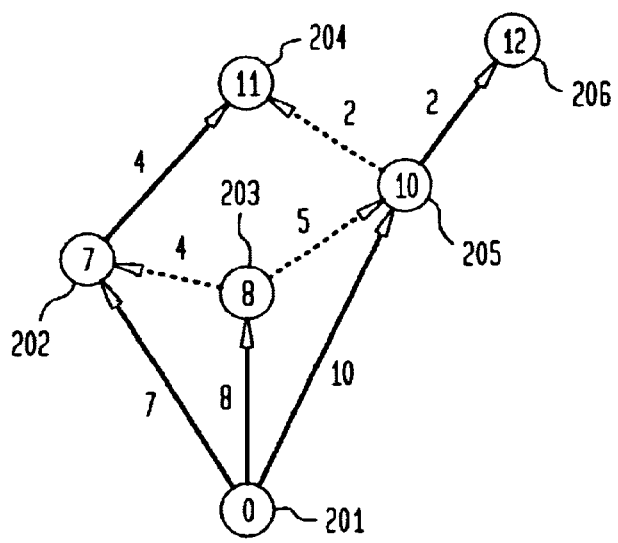
FIG. 2 shows network of six nodes and a shortest path tree for the network.

To illustrate, FIG. 2 shows a network 200 comprising six nodes 201 to 206. The links (edges) between the nodes are illustrated with either dotted or solid arrows, and the numeral adjacent to each arrow is the weight of the corresponding edge. The numeral inside each node, termed a distance attribute, represents the shortest (Euclidean) distance from the root node (node 201) to the node of the distance attribute. The distance attribute is the sum of the weights along the shortest path through the network from the root node to the corresponding node. When the link between nodes 201 and 203 has a weight of 8, for example, the SPT rooted at node 201 comprises the solid lines shown in FIG. 2; and the shortest distance of each node 201 to 206 is the number inside each ball (node).

Figure 3:
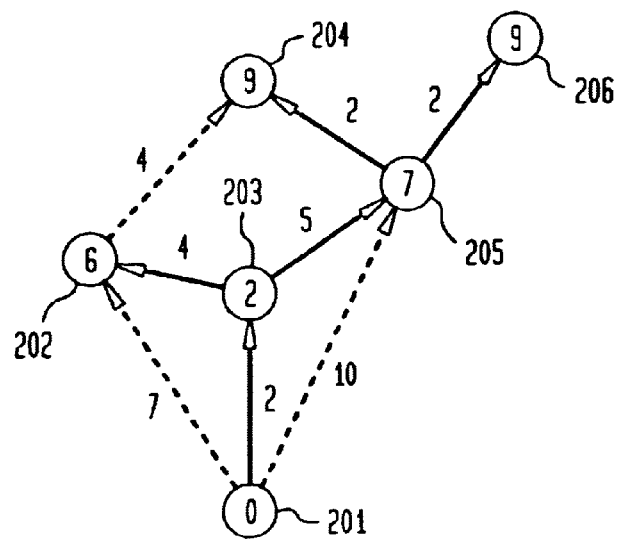
FIG. 3 shows a new shortest path tree determined after the edge of the network shown in FIG. 2 changes weight.

In response to a change in network topology, the edge between nodes 201 and 203 changes weight from 8 to 2. This weight change significantly alters the structure of the SPT rooted at node 201. FIG. 3 shows a new SPT determined after the edge of the network shown in FIG. 2 changes weight. FIGS. 4 and 5 illustrate the ball-and-string models for the networks in FIG. 2 and FIG. 3, respectively. The straight lines represent tight strings (edges) and the curly lines represent loose strings. The numeral adjacent to a string is the corresponding length of the string (which is the weight of the link). The shortest paths from node 201 to all other nodes are composed of the straight lines in the figures. When the link distance between nodes 201 and 203 is reduced from 8 to 2, node 203 is "raised" to a higher level.

FIG. 5 shows that some loose strings in the original model of FIG. 4 now become tight (the strings between nodes 202 and 203, 203 and 205, and 205 and 204), while other strings become loose (the strings between nodes 201 and 202, 201 and 205, and 202 and 204). Consequently, FIG. 5 shows that the affected nodes rearrange themselves into their optimal positions within the SPT defined by the "tight" strings as node 203 is raised to a higher level and letting all other nodes float. When the method of changing the length of the string between 201 and 203 reduces the length gradually, the sequence of distance changes performed when the balls are allowed to "drop" under "gravity" with the ball-and-string model corresponds to the optimal execution of the dynamic SPT algorithm.

The following compares calculation of the new SPT using two different methods to dynamically change the tree corresponding to the old SPT into the new SPT. The first method employs the dynamic SPT algorithm of the present invention based on maximum decrement of the distance attribute when an edge changes. The second method uses the shortest distance method such as employed by the Dijkstra algorithm.

Returning to FIG. 3, the edge between nodes 201 and 203 that decreases its weight remains in the new SPT and the shortest distance of node 203, and hence the distance attribute (Euclidean distance), is reduced to 2. Since node 203 has a shortest distance of 2, node 203 may become the parent node of nodes 202 and 205 in the new SPT, further decreasing the potential shortest distance of node 202 from 7 to 6 and the potential shortest distance of node 205 from 10 to 7. The modification of the SPT continues by considering either node 202 or node 205 to incrementally modify the SPT.

In accordance with the dynamic SPT algorithm, after the distance attribute of node 203 changes, node 205 is selected for consideration and modification. Node 205 is selected for consideration and modification before node 202 because node 205 has the greatest distance attribute decrease of Δ=3 (10 to 7), rather than Δ=1 (7 to 6). Using this maximum decrement as the selection criterion in accordance with the present invention may reduce the total number of computations for the new SPT. For this case, the parent (parent attribute) of node 205 becomes node 203 and its distance attribute becomes 7. The distance attribute of its child node, node 206, becomes 9. Next, either node 202 or node 204 may be selected for consideration and modification. Since node 204 has the largest potential maximum decrement Δ of 2 (i.e., the distance attribute changes from 11 to 9, rather than from 7 to 6 for node 202), node 204 is selected as a child of n 205 and acquires a distance attribute of 9. Finally, node 202 is considered and modified. Node 202 becomes a child of node 203 and acquires a distance attribute of 6.

If the Dijkstra algorithm is employed, which gives preference to nodes with the smallest potential distances, node 202 is selected for modification before node 205 because node 202's potential shortest distance (modified distance attribute) 6 is smaller than the potential shortest distance (modified distance attribute) 7 of node 205. At node 202, the parent of node 202 is changed from 201 to 203 and the distance attribute of node 202 is reduced to 6. Since node 202 has node 204 as a child node (child attribute), the distance attribute of node 204 is reduced from 11 to 10. Since node 204 does not have a directed edge to another neighbor, the distance attribute change of node 204 does not affect any other node. Then, the Dijkstra algorithm returns to node 205, decreases node 205's distance attribute to 7, and then defines node 205 as a child attribute of node 203. Since node 206 is a child node of node 205, the distance attribute of node 206 is reduced from 12 to 9. Finally, the distance attribute of node 204 is modified a second time by decreasing the distance attribute from 10 to 9 since node 204 is now a child of node 205.

Comparing the first method employing the dynamic SPT algorithm with the second method employing the Dijkstra algorithm illustrates the efficiency of the dynamic SPT algorithm. When nodes 205 and 204 are selected for modification of the SPT before selecting node 202, as is done by the dynamic SPT algorithm, the total number of computations required is reduced. Specifically, node 204 is considered in only one step by the dynamic SPT algorithm. The distance attribute of node 204 changes directly from 11 to 9, rather than the two steps (i.e., first from 11 to 10 and then from 10 to 9) of the Dijkstra algorithm. The dynamic SPT algorithm gives priority to the selection of nodes whose potential shortest distance decreases the most (or increases the least) as the new SPT is iteratively generated.

The dynamic SPT algorithm may be expressed as steps of a method or software program implemented by a processor of a router to generate new SPTs when a network topology change occurs. FIGS. 6A through 6E provide pseudo-code of an exemplary implementation of the dynamic SPT algorithm employed by a processor of a router. The definitions for values, sets, and elements expressed in FIGS. 6A through 6E are as described previously, with additional definitions as follows.

Each directed edge $e_i$ that is an element of the set of edges $\epsilon$ (i.e., $e_i \in \epsilon$) has a corresponding weight $W(e_i)$, source node $S(e_i)$, and end node $E(e_i)$. The length or distance of a directed path is defined as the sum of weights $W(e_i)$ of the edges $e_i$ that are contained in the path. Given a set of nodes N that are the set or a subset of nodes V ($N \subseteq V$), two sets of edges are associated with the set of nodes N. The first set is the set of edges directed into the nodes of the set of nodes N, and is defined as $I(N)=\{e \in \epsilon | E(e) \in N\}$. The second set is the set of edges directed out of the nodes of the set of nodes N, and is defined as $O(N)=\{e \in \epsilon | S(e) \in N\}$. The root node $n_0$ of the SPT is defined by the variable root(G).

A temporary tree data structure $\check{T}$ is maintained by the dynamic SPT algorithm to track the current SPT of a current iteration of the algorithm. The temporary tree data structure $\check{T}$ contains a list of every node n of the set of nodes N in the directed graph G, including the node's corresponding parent attribute $P(n, \check{T})$, list of child nodes (child attribute) $C(n, \check{T})$, distance attribute $D(n, \check{T})$, and Boolean attribute $V(n, \check{T})$. The Boolean attribute $V(n, \check{T})$ has the values floating and anchored to indicate that the node's distances may be moved (floating) or the node position is set (anchored) in the temporary tree data structure $\check{T}$. When the algorithm completes all steps, the remaining temporary tree data structure $\check{T}$ is set as the new SPT, denoted by T, and each node n has the corresponding value of the Boolean attribute $V(n, \check{T})$ set to anchored.

A list Q is maintained that temporarily contains a subset of nodes with at least three attributes. The attributes of a node n may preferably be a potential parent node p for node n, potential distance d for node n, and potential distance change (maximum decrement) $\Delta$ for node n (denoted as the set $Q=\{n, (p,d,\Delta)\}$. Three instructions (subroutines) are defined that operate on the list Q. The first instruction is defined as the ENQUEUE $(Q, \{n, (p,d,\Delta)\})$instruction that adds elements to the list Q. The second instruction is defined as the EXTRACTMIN (Q) instruction that removes elements from the list Q. When the EXTRACTMIN instruction is executed, the element having the smallest value for $\Delta$ is selected and removed from the list Q. If more than one element exists with a minimum value of $\Delta$, then the value of d is used to determine which element is selected. If more than one element has a minimum value of $\Delta$ and they have equivalent values for d, then any of the values having minimum $\Delta$ and d may be selected by the EXTRACTMIN instruction. The third instruction routine is defined as the REMOVE (n,Q) instruction that removes elements and corresponding attributes from the list Q.

Two additional subroutines may be defined. The first subroutine $B_{max}(n, \check{T})$ determines and stores the set of nodes (including the node n) that contains the descendants of n in the temporary tree data structure $\check{T}$. The set of nodes is computed by following the path down the temporary tree data structure $\check{T}$. Similarly, the second subroutine $B_{val}(n, \check{T})$ determines and stores the set of nodes that are reachable from the node n through a path of anchored nodes in the temporary tree data structure $\check{T}$. The set of nodes is computed by following the path down through the anchored nodes of the temporary tree data structure $\check{T}$ (the Boolean attribute $V(n, \check{T})$ of the node has the value anchored) and stopping when a floating node is encountered (the Boolean attribute $V(n, \check{T})$ of the node has the value floating ).

Returning to FIGS. 6A through 6E, the dynamic SPT algorithm includes an initialization step (beginning at Step 1 at line 601 of FIG. 6A) for either (A) creating an initial SPT (lines 603–610 of FIG. 6A) or (B) initializing the dynamic SPT algorithm after a network topology change creates an outdated SPT (lines 611–639 of FIG. 6B). After the initialization process, the new SPT is determined with the interative procedure including node selection Step 2, distance update Step 3, and node search Step 4, which are shown in FIGS. 6C through 6E, respectively.

An event, such as a router being provisioned or other network topology change, causes the dynamic SPT algorithm to begin at Step 1 (line 601 of FIG. 6A). Referring again to FIG. 6A, at line 602 the algorithm determines whether a current SPT exists in the node. If $n_0$ current SPT exists, the algorithm goes to (A) at line 603 to execute a static version of the algorithm to generate an initial SPT. For each node other than the root node $n_0$ (root(G)) for which the SPT is generated, the parent and child attributes are each set to the null set (lines 605 and 608), the node distance attribute is set to zero (line 606), and the Boolean attribute is set to floating (line 607). The root node (root(G)) and the corresponding initial entries of the attributes for the root node are added to the list Q with an execution of the ENQUEUE routine (line 609). As shown in line 610 of FIG. 6A, the static version then proceeds to Step 2 (line 640 of FIG. 6C) to generate the initial SPT.

As the execution of the algorithm is the same for the static version and the dynamic version after initialization (i.e., from Step 2 through Step 4 of FIGS. 6C–6E), the following describes the execution of the algorithm following the description of the initialization step type (B) of the dynamic version. The initialization of the static version is a trivial case, and computes an initial SPT for the root node (root(G)) from scratch. The initial SPT may be calculated by other methods at start-up, and so the present invention is not limited to determining the initial SPT as shown in FIGS. 6A and 6C–6E. Therefore, the type (A) initialization of lines 602–610 of FIG. 6A is optional.

If at line 602 of FIG. 6A the algorithm determines that a current SPT exists (i.e., when network topology changes), then the algorithm begins a type (B) initialization for the dynamic version (line 611 of FIG. 6B). First, the initialization of the dynamic version identifies those nodes that may be affected by the changes in the link states. The potentially affected nodes are those that are no longer connected to the root node (root(G)) through the same shortest path as before. Moreover, the initialization of the dynamic version selecting such set of potentially affected nodes minimizes the number of nodes whose changes in distance are subsequently propagated to descendents in the current (original) SPT and which may be considered and modified. Two cases of updating nodes in the temporary tree data structure $\check{T}$ of the algorithm are shown in FIG. 6B: Case 1 in which the weight of edges increase (lines 614–628), and Case 2 in which the weight of edges decrease (lines 630–638). In either case, the algorithm proceeds to Step 2 (line 640 of FIG. 6C) to begin the iterative generation of the new SPT.

Referring again to FIG. 6B, initially, the temporary tree data structure $\check{T}$ is set as the current SPT with all nodes having their the Boolean attributes set to anchored. In Case 1, after initializing the temporary node set $\check{N}$ to the null set (line 613), each edge $e_i$ that has a corresponding increase in weight $(e_i \in \epsilon^+)$ (line 614) is updated with the corresponding new increase $\Gamma_i$ in weight (line 615). The algorithm then checks if the edge $e_i$ is in the current SPT (temporary tree data structure $\check{T}$) at line 616 (i.e., if the source node of the edge $e_i$ is a parent of an end node of the edge $e_i$ ($E(e_i)$) included in $\check{T}$). If the edge $e_i$ is in the current SPT, the algorithm deletes the edge $e_i$ and selects the end node $E(e_i)$ of the edge $e_i$ (lines 616–617). The algorithm also selects, by execution of subroutine $B_{val}(n, \check{T})$ at line 618, all descendent nodes $N_d$ of the end node $E(e_i)$ that are reachable by nodes that have their Boolean attribute set to anchored in the existing SPT. All such descendent nodes (line 620) have their Boolean attribute set to floating (line 621) and are then included in the temporary node set $\check{N}$ (line 622). The temporary node set $\check{N}$ covers all the affected nodes. Moreover, only those nodes that are directly coupled to anchored nodes in the current SPT are considered because the descendent nodes $N_d$ of the nodes in temporary node set $\check{N}$ are updated in subsequent Steps 2–4 of the algorithm.

For the current (outdated) SPT, all of the nodes initially have their corresponding Boolean attribute set to anchored (an anchored node). As described previously, when the weight of one or more edges increases, the potentially affected nodes have their Boolean attribute set to floating (a floating node) during the initialization of the dynamic version. Each anchored (source) node $S(e_i)$ is determined that is coupled to an edge (link) directed into a floating (end) node $E(e_i)$ in the temporary node set $\check{N}$(lines 623–624). For such nodes, the potential distance newdist of the anchored (source) node is determined by adding the distance of the anchored (source) node $S(e_i)$ and the weight of the edge connecting the floating (end) node $E(e_i)$ and anchored (source) node $S(e_i)$ (line 625). The difference $\Delta$ between the old distance attribute of the source node $S(e_i)$ and the potential new distance newdist is also stored (line 626). The end node $E(e_i)$ with Boolean attribute set to floating and corresponding attributes $\Delta$, potential distance newdist, and potential new parent (the anchored source node $S(e_i)$) are added to the list Q by executing the ENQUEUE routine (line 627). In Case 1, after determining the set of floating nodes for each edge $e_i$ with new increased weight, the algorithm proceeds to Step 2 (line 629).

For Case 2 at line 630, the algorithm determines the set of floating nodes for each edge $e_i$ having a new decrease $\Gamma_i$ in weight ($e_i \in^-$). After updating each edge $e_i$ with the corresponding weight decrease $\Gamma_i$ (lines 631–632), the potential new distance newdist of its end node $E(e_i)$ is computed by adding the distance of its source node $S(e_i)$ and the new weight $W(e_i)$ (line 633). If this potential new distance newdist is smaller than the old distance attribute of the end node $E(e_i)$ (line 634), then the node $E(e_i)$ with corresponding attributes of potential new parent $S(e_i)$, potential new distance newdist, and difference $\Delta$ between its old distance attribute and the potential new distance newdist (line 636) are added to the list Q by executing the ENQUEUE routine (line 637). In Case 2, after determining and adding to the list Q the set of nodes and corresponding attributes for each edge $e_i$ with new decreased weight, the algorithm proceeds to Step 2 (line 639).

Once the initialization of the dynamic version is complete, the algorithm proceeds to Step 2 (line 640 of FIG. 6C) to begin generating the new SPT. Since the algorithm employs an iterative procedure, at line 641 a test is made to determine if the list Q contains elements (nodes) of the temporary data tree structure $\check{T}$ that have attributes that may be updated. If the list Q has no such elements, indicating that the algorithm has completed, the temporary tree data structure $\check{T}$ is set as the new SPT. When the program has determined the new SPT, the program is terminated (line 642). Otherwise, processing proceeds to line 644.

A node y with the smallest value (least positive value or most negative value) for potential distance change $\Delta$ is extracted from the list Q by executing the EXTRACTMIN instruction (line 644). The EXTRACTMIN instruction returns a nodey in the list Q that has a potential distance change $\Delta$ that is either the smallest increase in distance (determined in Case 1) or largest decrease in distance (determined in Case 2). This selected node y has parent node x, potential distance d, and potential distance change $\Delta$. This selected node y is then updated with its new parent indicated in the temporary tree data structure $\check{T}$ and the temporary tree data structure $\check{T}$ is modified accordingly to reflect child and parent node relations (lines 646–648). All the descendent nodes of the selected node y are then identified and stored as the set denoted by $N_d$ by executing the subroutine $B_{max}(y, \check{T})$ (line 649). The algorithm then proceeds at line 650 to Step 3 beginning at line 651 of FIG. 6D.

As shown in FIG. 6D, the distance attributes of the selected node y and all of node y's descendent nodes (denoted by the set $N_d$) (line 652) in the temporary tree data structure $\check{T}$ are updated. The selected node y together with all its descendent nodes have their corresponding distance attributes updated as their old distance attribute $D(n, \check{T})$ incremented by $\Delta$ (line 653). In addition, the Boolean attributes of the selected node y and all its descendent nodes are set to anchored (line 655). If any such node n in the set $N_d$ is already in the list Q (line 660), the node will be removed from Q by executing the REMOVE subroutine, and the node is no longer updated or modified. However, if the parent attribute of the node n in list Q is the same as the parent attribute of node n in temporary tree data structure $\check{T}$, the node is not removed since this indicates that further modifications to the node will occur. At line 658, the algorithm proceeds to Step 4 shown in FIG. 6E.

As shown in Step 4 of FIG. 6E, the edges directed out of the set of nodes $N_d$ (denoted as the set $O(N_d)$ are searched and updated (line 660). The set $O(N_d)$ includes each end node $E(e)$ that is attached to an edge e directed out of a source node $S(e)$ that is included in the set $N_d$. At line 661, a test is performed to determine if the potential new distance newdist of the end node $E(e)$ (which is equal to $W(e)$ plus the distance attribute of the source node $S(e)$) is smaller than the old distance attribute of the end node $E(e)$, or if the end node $E(e)$ has its Boolean attribute set to floating,. If the test is true, the potential new distance newdist of $E(e)$ is set to the old potential distance newdist minus the distance of $E(e)$ (line 664), and potential new distance change $\Delta$ is set to $W(e)$ plus the distance of $S(e)$ (line 665). The ENQUEUE instruction is executed and the end node $E(e)$ added to the list Q for further updating (line 667). The list Q, therefore, now has the node $E(e)$ added with its potential new distance newdist, change in distance $\Delta$, and its potential new parent $p=S(e)$. After step 4 is completed, processing returns to Step 2 (i.e., line 669 of Step 4 returns to line 640 of Step 2), and the process repeated until the list Q is empty.

Figure 7:
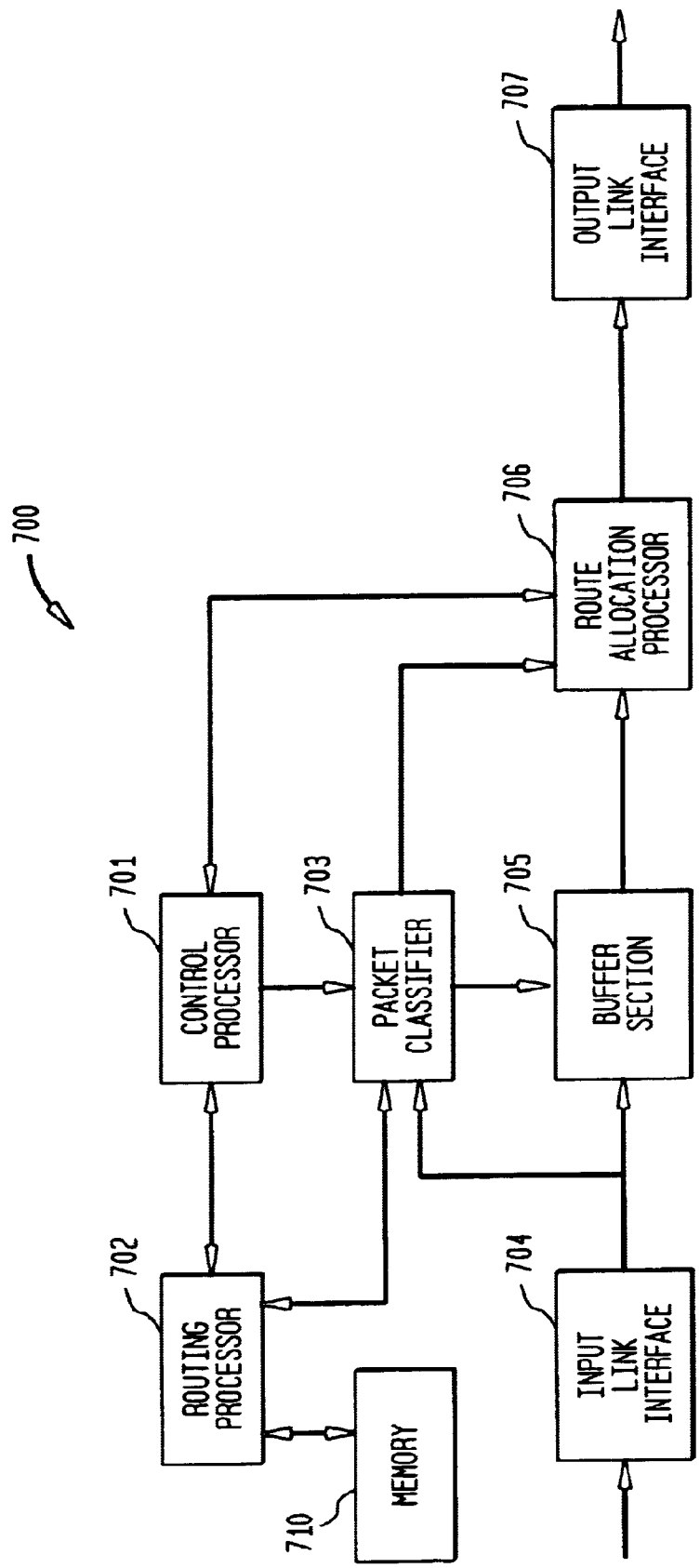
FIG. 7 shows a block diagram of a processing section of a router generating a shortest path tree with the dynamic SPT algorithm of the present invention.

FIG. 7 shows a block diagram of an exemplary processing section 700 of a router, e.g., router of node 201 of FIGS. 2 and 3, employing the dynamic SPT algorithm in accordance with the present invention. Processing section 700 includes a control processor 701, routing processor 702, packet classifier 703, input link interface 704, buffer section 705, route allocation processor 706, output link interface 707, and memory 710. An implementation of the processing section and link interfaces of such a router may be embodied in, for example, a PacketStar 6400 router, available from Lucent Technologies Inc. of Murray Hill, N.J.

Routing processor 702 may monitor and receive network topology information in accordance with the open shortest path first (OSPF) protocol. The network topology information may be stored in a database in memory 710 for use by the dynamic SPT algorithm of the present invention. Routing processor 702 generates an SPT as described previously, and a corresponding forwarding table.

Control processor 701 may coordinate functions of the processing section, including loading new routing information and packet filters into packet classifier 703 based on forwarding tables generated from an SPT. Control processor 701 may also monitor control messages received from the network that follow the OSPF protocol to determine if a new SPT should be calculated.

Packets of one or more packet flows are received at the input link interface 704 of the processing section 700. Input link interface 704 may define one or more input ports, and may comprise the receive sections of one or more line termination cards that terminate at least one transmission line. The termination cards, such as T1, T3 or OC-3 termination cards, support one or more links through the bandwidth of each transmission line. Packets received from the input link interface are queued for processing in buffer section 705, and may be concurrently provided to the packet classifier 703. Buffer section 705 may include buffers allocated to each input port. Packet classifier 703 contains one or more packet filters determining filter rules to be applied to each received packet. Based on the filter rules, route allocation processor 706, which may be a cross-bar switch, redirects the packet from the buffer section 705 to one or more corresponding output ports of the output link interface 707. Output link interface 707 may define one or more output ports, and may comprise transmit sections of one or more line termination cards that terminate at least one transmission line.

While the exemplary embodiments of the present invention have been described with respect to steps of method, the present invention is not so limited. As would be apparent to one skilled in the art, various functions may be implemented in hardware by circuit elements and may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A routing processor of a router for routing packet network based on a shortest path tree (SPT) defining paths between nodes in the network, the routing processor comprising:

an initialization module adapted to generate, for a current SPT, a temporary list of nodes in the network affected by a change in the weight of a link between two nodes in the network, wherein the change corresponds to the addition of a new link in the network or an increase or decrease in the weight of an existing link in the network;

a node selection module adapted to select a node of the list in accordance with a maximum decrement criterion, the maximum decrement criterion identifying the node in the list having a most negative or a least positive associated distance change resulting from the change in the weight of the link;

an update module adapted to update one or more paths in current SPT for nodes reachable from the selected node, wherein the selected node is removed from the list and zero, one, or more of the reachable nodes are added to the list;

wherein the node selection module and the update module repeatedly select nodes and update paths until the list is empty to generate an updated SPT, the router thereby causing one or more packets to be routed in accordance with the updated SPT, wherein the initialization module is further adapted to define a temporary tree data structure for a current SPT, the temporary tree data structure including a set of edges interconnecting a root node with one or more nodes of the plurality of nodes, each node having associated parent and child nodes and associated distance attribute, and each edge corresponding to a link and having the associated weight of the link, wherein the initialization module is further adapted to generate the temporary list of one or more nodes effected by a change of an edge weight, each entry of the temporary list having the associated parent node, a new distance attribute resulting from the weight change, and a distance change, and wherein the update processor is further adapted to update the one or more paths defined in the temporary tree data structure by:
   (1) updating the parent and child nodes associated with the node selected in step (b),
   (2) updating, with the distance change, the distance attribute of the selected node and each descendent node of the selected node,
   (3) defining, if necessary, a new distance attribute and a distance change for each node receiving an edge from either the node selected in step (b) or a descendent node of the selected node,
   (4) adding to the temporary list each node receiving an edge in step (f) and the corresponding parent node, new distance attribute, and distance change, and
   (5) setting, when the temporary list is empty, the updated temporary tree data structure as the updated SPT.

2. The invention as recited in claim 1, wherein the initialization processor is further adapted to, if a current SPT doesn't exist, generate a current SPT by defining the temporary tree data structure as the root node and the remaining nodes of the plurality of nodes, the associated parent and child nodes of each of the remaining nodes being set to the null set, and the associate distance attribute of each of the remaining nodes being set to zero.

3. The invention as recited in claim 1, wherein the initialization processor:
   1) updates the edge weight in the temporary tree data structure corresponding to the change in the edge weight;
   2) defines a set of one or more nodes each i) having a parent node and a distance attribute, ii) interconnected to the root node, and iii) affected by the weight change of the edge; determines the new distance attribute for each node, the new distance attribute corresponding to a path having a minimum sum of the edge weights from the root node to the node when an edge weight changes; and adds the nodes of the set to the temporary list; and
   (3) determines a distance change for each node of the temporary list, the distance change corresponding to the difference between the distance attribute and the new distance.

4. The invention as recited in claim 3, wherein each edge is defined by a source node and an end node the initialization processor defines each node of the temporary tree data structure as an anchored node, and the initialization processor generates the temporary list for either of two cases of the change of the edge weight: a first case corresponding to an increase in edge weight and a second case corresponding to a decrease in edge weight.

5. The invention as recited in claim 4, wherein the initialization processor generates the temporary list for the first case by:
   if the edge is in the temporary tree data structure,:
      A) determining the descendent nodes of the end node that are reachable through edges of the temporary tree data structure and setting each of the determined descendent as a floating node; and
   for each edge having an end node being a floating node and a source node being an anchored node:
      B) setting the new distance attribute of the end node as the distance attribute of the source node combined with the updated edge weight, the distance change of the end node to the difference between the new distance attribute and the distance attribute of the end node, and adding to the temporary list the end node and the corresponding source node as the parent node, the new distance attribute and the distance change; and
   wherein the node selection processor is adapted to set the selected node and each descendent node as being anchored nodes.

6. The invention as recited in claim 4, wherein:
   the initialization processor generates the temporary list for the second case by setting the new distance attribute of the end node as the distance attribute of the source node combined with the updated edge weight; and
   if the new distance attribute is less than the distance attribute of the end node, setting the distance change of the end node to the difference between the new distance attribute and the distance attribute of the end node, and adding to the temporary list the end node and the corresponding source node as the parent node, the new distance attribute and the distance change.

7. A method for routing packets in a packet network based on a shortest path tree (SPT) defining paths between nodes in the network, comprising the steps of:
   (a) generating, for a current SPT, a temporary list of nodes in the network affected by a change in the weight of a link between two nodes in the network, wherein the change corresponds to the addition of a new link in the network or an increase or decrease in the weight of an existing link in the network;
   (b) selecting a node of the list in accordance with a maximum decrement criterion, the maximum decrement criterion identifying the node in the list having a most negative or a least positive associated distance change resulting from the change in the weight of the link;
   (c) updating one or more paths in current SPT for nodes reachable from the selected node, wherein the selected node is removed from the list and zero, one, or more of the reachable nodes are added to the list;
   (d) repeating steps (b) and (c) until the list is empty to generate an updated SPT, thereby routing one or more packets in accordance with the updated SPT; and
   (e) defining a temporary tree data structure for a current SPT, the temporary tree data structure including a set of edges interconnecting a root node with one or more nodes of the plurality of nodes, each node having associated parent and child nodes and associated distance attribute, and each edge corresponding to a link and having the associated weight of the link; and wherein:
      step (a) generates the temporary list of one or more nodes effected by a change of an edge weight, each entry of the temporary list having the associated parent node, a new distance attribute resulting from the weight change, and a distance change;
      step (c) updates the one or more paths defined in the temporary tree data structure by:
         (c1) updating the parent and child nodes associated with the node selected in step (b),
         (c2) updating, with the distance change, the distance attribute of the selected node and each descendent node of the selected node,
         (c3) defining, if necessary, a new distance attribute and a distance change for each node receiving an edge from either the node selected in step (b) or a descendent node of the selected node, and
         (c4) adding to the temporary list each node receiving an edge in step (f) and the corresponding parent node, new distance attribute, and distance change; and
      for step (d) repeating the steps (b) and (c) until the temporary list is empty, the updated temporary tree data structure being the updated SPT.

8. The method as recited in claim 7, further comprising the steps of:
   if a current SPT doesn't exist, generating a current SPT by defining the temporary tree data structure as the root node and the remaining nodes of the plurality of nodes, the associated parent and child nodes of each of the remaining nodes being set to the null set, and the associate distance attribute of each of the remaining nodes being set to zero.

9. The method as recited in claim 7, wherein step (a) includes the steps of:
   (a1) updating the edge weight in the temporary tree data structure corresponding to the change in the edge weight;
   (a2) defining a set of one or more nodes each i) having a parent node and a distance attribute, ii) interconnected to the root node, and iii) affected by the weight change of the edge;
   (a3) determining the new distance attribute for each node of the set of step (a2), the new distance attribute corresponding to a path having a minimum sum of the edge weights from the root node to the node when an edge weight changes;
   (a4) determining a distance change for each node of the temporary list, the distance change corresponding to the difference between the distance attribute and the new distance; and
   (a5) adding the nodes of the set to the temporary list.

10. The method as recited in claim 9, wherein each edge is defined by a source node and an end node, step a) defines each node of the temporary tree data structure as an anchored node, and step (a) generates the temporary list for either of two cases of the change of the edge weight: a first case corresponding to an increase in edge weight and a second case corresponding to a decrease in edge weight.

11. The method as recited in claim 10, wherein step (a) generates the temporary list for the first case by the steps of:

if the edge is in the temporary tree data structure:
- (a2i) determining the descendent nodes of the end node that are reachable through edges of the temporary tree data structure;
- (a2ii) setting each of the descendent nodes determined in step (a2i) as a floating node; and for each edge having an end node being a floating node and a source node being an anchored node:
- (a3i) setting the new distance attribute of the end node as the distance attribute of the source node combined with the updated edge weight of step (a 1),
- (a4i) setting the distance change of the end node to the difference between the new distance attribute and the distance attribute of the end node, and
- (a5i) adding to the temporary list the end node and the corresponding source node as the parent node, the new distance attribute and the distance change; and wherein step (b) includes the step of setting the selected node and each descendent node as being anchored nodes.

12. The method as recited in claim 10, wherein step (b) generates the temporary list for the second case by the steps of:
- (a3i) setting the new distance attribute of the end node as the distance attribute of the source node combined with the updated edge weight of step (a1); and if the new distance attribute is less than the distance attribute of the end node:
- (a4i) setting the distance change of the end node to the difference between the new distance attribute and the distance attribute of the end node, and
- (a5i) adding to the temporary list the end node and the corresponding source node as the parent node, the new distance attribute and the distance change.

13. A computer-readable medium having stored thereon a plurality of instructions, the plurality of instructions including instructions which, when executed by a processor, cause the processor to implement a method for routing packets in a packet network based on a shortest path tree (SPT) defining paths between nodes in the network, the method comprising the steps of:
- (a) generating, for a current SPT, a temporary list of nodes in the network affected by a change in the weight of a link between two nodes in the network, wherein the change corresponds to the addition of a new link in the network or an increase or decrease in the weight of an existing link in the network;
- (b) selecting a node of the list in accordance with a maximum decrement criterion, the maximum decrement criterion identifying the node in the list having a most negative or a least positive associated distance change resulting from the change in the weight of the link;
- (c) updating one or more paths in current SPT for nodes reachable from the selected node, wherein the selected node is removed from the list and zero, one, or more of the reachable nodes are added to the list;
- (d) repeating steps (b) and (c) until the list is empty to generate an updated SPT, thereby routing one or more packets in accordance with the updated SPT; and
- (e) defining a temporary tree data structure for a current SPT, the temporary tree data structure including a set of edges interconnecting a root node with one or more nodes of the plurality of nodes, each node having associated parent and child nodes and associated distance attribute, and each edge corresponding to a link and having the associated weight of the link; and wherein:
step (a) generates the temporary list of one or more nodes effected by a change of an edge weight, each entry of the temporary list having the associated parent node, a new distance attribute resulting from the weight change, and a distance change;

step (c) updates the one or more paths defined in the temporary tree data structure by:
- (c1) updating the parent and child nodes associated with the node selected in step (b),
- (c2) updating, with the distance change, the distance attribute of the selected node and each descendent node of the selected node,
- (c3) defining, if necessary, a new distance attribute and a distance change for each node receiving an edge from either the node selected in step (b) or a descendent node of the selected node, and
- (c4) adding to the temporary list each node receiving an edge in step (f) and the corresponding parent node, new distance attribute, and distance change; and for step (d) repeating the steps (b) and (c) until the temporary list is empty, the updated temporary tree data structure being the updated SPT.

* * * * *

UNITED STATES PATENT AND TRADEMARK OFFICE
CERTIFICATE OF CORRECTION

PATENT NO. : 6,704,320 B1
DATED : March 9, 2004
INVENTOR(S) : Paolo Narvaez, Kai-Yeung Siu and Hong-Yi Tzeng It is certified that error appears in the above-identified patent and that said Letters Patent is hereby corrected as shown below:

Column 13,
Line 51, replace "A routing processor of a router for routing packet network based on..." with -- A routing processor of a router for routing packets in a packet network based on... --.

Signed and Sealed this

Twenty-second Day of June, 2004

JON W. DUDAS
*Acting Director of the United States Patent and Trademark Office*